United States Patent [19]

Iwamoto et al.

[11] Patent Number: 5,677,081
[45] Date of Patent: Oct. 14, 1997

[54] SOLID-STATE LITHIUM SECONDARY BATTERY

[75] Inventors: Kazuya Iwamoto, Sakai; Noboru Aotani, Uji; Kazunori Takada, Osaka; Shigeo Kondo, Hirakata, all of Japan

[73] Assignee: Matsushita Electric Industrial Co., Ltd., Osaka-fu, Japan

[21] Appl. No.: 752,969

[22] Filed: Dec. 2, 1996

Related U.S. Application Data

[63] Continuation of Ser. No. 529,129, Sep. 15, 1995, abandoned.

[30] Foreign Application Priority Data

| Sep. 21, 1994 | [JP] | Japan | 6-226578 |
| Sep. 21, 1994 | [JP] | Japan | 6-226579 |
| Sep. 21, 1994 | [JP] | Japan | 6-226580 |

[51] Int. Cl.$^6$ ................................................ H01M 10/36
[52] U.S. Cl. ...................... 429/191; 429/193; 429/225
[58] Field of Search ................................ 429/191, 225, 429/229, 193

[56] References Cited

U.S. PATENT DOCUMENTS

| 4,444,857 | 4/1984 | Duchange et al. | 429/191 |
| 4,599,284 | 7/1986 | Arkidge . | |
| 5,217,826 | 6/1993 | Yamamura et al. | 429/191 |
| 5,514,490 | 5/1996 | Chen et al. | 429/191 |

FOREIGN PATENT DOCUMENTS

| A-0 206 339 | 12/1986 | European Pat. Off. . |
| A-0 469 574 | 2/1992 | European Pat. Off. . |
| 61-126770 | 6/1986 | Japan . |
| A-05 310418 | 2/1994 | Japan . |

OTHER PUBLICATIONS

Malugani et al.; "New Types of Lithium Ion Conductive Glass and Their Applications in Electrochemical Generators;" Solid State Ionics 9 & 10; North–Holland Publishing Company (1983); pp 659–665 (translation included) (no month).

A. S. Baranski et al.; "The Formation of Lithium–Aluminum Alloys at an Aluminum Electrode in Propylene Carbonate;" Journal Of The Electrochemical Society, vol. 129, No. 5 (May, 1982); pp. 901–907.

Y. S. Fung et al.; "Cyclic Voltammetric Investigation of the Formation of Intermetallic Phases at a LiAl Electrode in Methyl Acetate;" Journal Of Applied Electrochemistry 22 (1992); pp. 255–261.

*Primary Examiner*—John S. Maples
*Attorney, Agent, or Firm*—Panitch Schwarze Jacobs & Nadel, P.C.

[57] ABSTRACT

A solid-state lithium secondary battery having a high safety and being free from the formation and growth of lithium dendrites is disclosed. It comprises a cathode having as an active material at least one compound selected from the group consisting of oxides and sulfides of a transition metal, a lithium ion-conductive solid electrolyte of a glass comprising $Li_2S$, and an anode having as an active material a metal capable of forming an alloy with lithium, wherein at least one of the cathode active material and anode active material contains lithium.

6 Claims, No Drawings

SOLID-STATE LITHIUM SECONDARY BATTERY

This is a continuation of Ser. No. 08/529,129, filed Sep. 15, 1995, now abandoned.

BACKGROUNDS OF THE INVENTION

1. Field of the Invention

The present invention relates to a solid-state lithium secondary battery using a lithium ion-conductive solid electrolyte.

2. Description of the Prior Art

With the current development of compact and lightweight portable electric or electronic equipments such as videotape recorders integrally mounted with a camera or handy phones, there has been an increasing demand for a secondary battery having a high energy density to serve as their power source. Under such circumstances, various studies have been focused on a lithium secondary battery as a battery which can provide a high energy density, because lithium is a metal which has a small atomic weight and can offer a large ionization energy.

The lithium secondary battery for the above-mentioned applications normally uses an organic electrolyte. Therefore, when a metal such as aluminum or indium is employed for its anode, the metal is liable to form an alloy with lithium and becomes fragile, the active material is reduced into minute particles. As a result, the bonding ability of the active material to the electrode decreases and it readily falls off from the electrode. These phenomena may invite a decrease in an apparent surface area of the electrode, a passivation of the surface of the metal anode as a result of reaction with the electrolyte, and an increase in impedance at some regions of the battery.

As a result, a current may concentrate on other regions of low impedance, thereby inviting a formation of dendrites, which may sometimes penetrate a separator placed between the anode and the cathode. This causes a problem of short-circuiting inside the battery.

On the other hand, a solid-state battery which employs a solid electrolyte comprising a halide such as lithium iodide or the like may also produce a high impedance region because of formation of a halide on the surface of the metal anode. Therefore, the battery of this-type is also susceptible to the problem of the current concentration on its low impedance regions, thereby inviting the dendrite formation, as in the organic electrolyte lithium battery. In addition to this, the formation of high impedance regions sometimes decreases the rate of electrochemical reaction in these regions and eventually decreases the apparent surface area participating in the electrochemical reaction. As a result, the battery of this-type is susceptible to a disadvantage of deteriorated charge/discharge cycle performance as a rechargeable battery.

In order to overcome the problem of the dendrite formation and to improve the reliability of the battery, it has been proposed to employ a carbon material which can absorb and desorb lithium in a reversible manner between the layers of carbon, or to add a dendrite formation inhibitor to the electrolyte.

These proposals however failed to completely suppress the formation of dendrites when the battery was subjected to such a severe operating condition as charging at a large current density. In the lithium secondary battery using the organic electrolyte and having a high energy density, there has been a problem of possible firing inside the battery, probably due to the dendrite formation and the subsequent short-circuiting between the anode and the cathode.

SUMMARY OF THE INVENTION

In order to overcome the above-mentioned problems involved in the prior art batteries, the present invention provides a solid-state lithium secondary battery which can effectively prevent the dendrite formation in the anode and the falling-off of the active material from the anode, which have been inevitable in the use of an organic electrolyte or a solid electrolyte containing a halide as in the prior art.

The present invention provides a solid-state lithium secondary battery comprising:

a cathode having as the active material at least one compound selected from the group consisting of oxides and sulfides of a transition metal, a lithium ion-conductive solid electrolyte of a glass comprising $Li_2S$, and an anode having as the active material a metal capable of forming an alloy with lithium, wherein at least one of the above-mentioned cathode active material and anode active material contains lithium.

More precisely, in the solid-state lithium secondary battery in accordance with the present invention, the metal active material of the anode contains lithium at least in its charged state, while the active material of the cathode contains lithium at least in its discharged state.

In a preferred embodiment of the present invention, the metal active material of the anode is a single metal or an alloy composed of two or more metals selected from the group consisting of In, Pb, Zn, Sn, Sb, Bi, Cd, Ga and Ti.

It is also possible to use an alloy containing as the main component at least one metal selected from the group consisting of In, Pb, Zn, Sn, Sb, Bi, Cd, Ga and Ti.

In another preferred embodiment of the present invention, the metal active material of the anode is Al or ban alloy containing Al as its main component.

The above-mentioned metal active material of the anode is in the form alloyed with lithium at least in the charged state of the battery.

In a preferred embodiment of the present invention, the active material of the cathode is at least one compound selected from the group consisting of $Li_xCoO_2$, $Li_xMnO_2$, $Li_xMn_2O_4$, $Li_xNiO_2$, $Li_xTiS_2$, $Li_xMoS_2$, and $Li_xMo_6S_8$ (wherein $x \geq 0$).

In another preferred embodiment of the present invention, the solid electrolyte further comprises at least one member selected from the group consisting of $SiS_2$, $Al_2S_3$, $P_2S_5$, and $B_2S_3$.

In still another preferred embodiment of the present invention, the solid electrolyte further comprises at least one member selected from the group consisting of $Li_2O$, $Li_3PO_4$, $Li_2SO_4$, and $Li_2CO_3$.

While the novel features of the present invention are set forth particularly in the appended claims, the invention, both as to organization and content, will be better understood and appreciated, along with other objects and features thereof, from the following detailed description taken in conjunction with the preferred embodiments.

DESCRIPTION OF THE PREFERRED EMBODIMENTS

The solid-state lithium secondary battery in accordance with the present invention employs a solid electrolyte in a glass state represented by $Li_2S$—X or $Li_2S$—X—Y, wherein X represents at least one member selected from the group consisting of $SiS_2$, $Al_2S_3$, $P_2S_5$, and $B_2S_3$, and Y represents at least one member selected from the group consisting of $Li_2O$, $Li_3PO_4$, $Li_2SO_4$, and $Li_2CO_3$ for its electrolyte layer.

Since these glass solid electrolytes do not contain any halide, they do not form any high impedance layer or region on the surface of the anode due to the reaction of the metal active material with the halide.

Further, since the solid electrolyte is in close contact with the surface of the anode, the anode active material is effectively prevented from falling off from the electrode even if the active material is reduced into minute particles by possible alloying with lithium, and it demonstrates a preferable function in increasing the surface area which can participate in the reaction. As a result, current distribution on the electrode is made uniform, and no lithium dendrites are formed; thus a short-circuiting inside the battery due to the dendrite formation can effectively be prevented and it is possible to obtain a lithium secondary battery having a very high reliability.

When the composition of the solid electrolyte is represented by the formula $aLi_2S$-$(1-a)X$ or $bY$-$(1-b)[aLi_2S$-$(1-a)X]$, it is preferable that $0.3<a$, and $b<0.3$.

In case of using powder for the electrode active material, it is preferable to prepare an electrode by mixing the active material powder with the powder of the solid electrolyte. The mixing ratio of the cathode active material powder to the solid electrolyte powder is preferably in a range of 3:7 to 9.5:0.5 (active material:solid electrolyte). Further, it is preferable to prepare the anode by mixing 25 wt % or more of the electrolyte powder with the alloy powder.

A solid electrolyte consisting of sulfides only has a low decomposition potential of 3–3.5 V (vs. $Li^+/Li$). For this, if this electrolyte is employed in a battery which uses an oxide of a transition metal generating a high electromotive force of about 4 V (vs. $Li^+/Li$) for the cathode active material, the electrolyte is oxidized and decomposed. Therefore, it is suitable to use $Li_2S$—X—Y in accordance with the present invention as the electrolyte for a battery which uses an oxide of a transition metal for its cathode active material.

In the embodiments which will be described later, the solid electrolyte was prepared in the following manner. More specifically, after mixing the predetermined amounts of the raw materials, the mixture was filled in a crucible made of glassy carbon and allowed to react in a flowing argon gas at 1,000° C. for 2 hours, and the obtained molten reaction product was quenched ultra-rapidly by means of a twin roller to give the solid electrolyte glass (in an amorphous state).

In the following paragraphs, the present invention will be described in more detail with reference to the preferred embodiments. Procedures in the following examples were all performed in a dry box filled with an inert gas.

EXAMPLE 1

A lithium secondary battery was configured by employing an indium (In) foil as the anode active material, a $0.01Li_3PO_4$-$0.63Li_2S$-$0.36SiS_2$ glass as the lithium ion-conductive solid electrolyte and lithium cobalt dioxide ($LiCoO_2$) as the cathode active material, respectively. Details thereof are shown as follows.

First, the lithium ion-conductive solid electrolyte in a glass state represented by the formula $0.01Li_3PO_4$-$0.63Li_2S$-$0.36SiS_2$ was pulverized in a mortar to have a particle size corresponding to 100 mesh or smaller, and the pulverized product was press-molded into a disk having a diameter of 10 mm and a thickness of 1.0 mm.

Then, the lithium cobalt dioxide ($LiCoO_2$) was mixed with the above-mentioned pulverized product of lithium ion-conductive solid electrolyte in the glass state at a weight ratio of 2:3, and the mixture was press-molded into a disk having a diameter of 10 mm and a thickness of 0.5 mm to give a cathode.

An anode was prepared by punching the indium foil having a thickness of 0.1 mm into a disk having a diameter of 10 mm. Thereafter, a solid-state lithium secondary battery was configured by sandwiching the above-mentioned molded solid electrolyte between the above-mentioned anode and cathode, by pressure.

The lithium secondary battery thus obtained was subjected to repeated charging and discharging cycles at a current density of 100 μA/cm². As a result, there was no decrease in the charge/discharge capacity of the battery from its initial value even after a lapse of 1,000 cycles. The charge/discharge efficiency was maintained at 100% throughout the repeated charging and discharging cycles and the battery operated stably.

When this lithium battery was disassembled in its charged state to observe the state of an interface between the anode and the solid electrolyte through a microscope, any formation of lithium dendrites was not recognized.

In addition, the results of measurements of the changes in impedance by aging, performed by placing the battery in its charged state in a thermostat at 80° C., showed no change in the impedance after a lapse of 2,000 hours.

This shows that in accordance with the present invention, a lithium secondary battery can be obtained which has a high safety and is free from the formation and growth of lithium dendrites.

EXAMPLES 2–30

Batteries were configured by repeating the procedures disclosed in Example 1 except that different materials were used for the anode, the solid electrolyte and the cathode in various combinations as listed in Table 1, Table 2 and Table 3 below. These batteries were evaluated in a manner similar to that in Example 1. Table 1, Table 2 and Table 3 summarize the results of evaluations on the batteries configured with various combinations, together with the result of Example 1.

TABLE 1

| Example No. | Cathode active material | Solid electrolyte | Anode | Charge/discharge cycle No. | Impedance change (hr.) | Dendrite formation |
|---|---|---|---|---|---|---|
| 1 | $Li_xCoO_2$ (x = 1) | $0.01Li_3PO_4$-$0.63Li_2S$-$0.36SiS_2$ | In | >1000 | >2000 | None |

TABLE 1-continued

| Example No. | Cathode active material | Solid electrolyte | Anode | Charge/discharge cycle No. | Impedance change (hr.) | Dendrite formation |
|---|---|---|---|---|---|---|
| 2 | $Li_xTiS_2$ (x = 1) | $0.6Li_2S$-$0.4SiS_2$- | In | >950 | >1500 | None |
| 3 | $Li_xTiS_2$ (x = 0.8) | $0.6Li_2S$-$0.4SiS_2$ | 0.5In-0.5Zn | >1050 | >1350 | None |
| 4 | $LiTiS_2$ | $0.4Li_2S$-$0.4Al_2S_3$ | In | >1000 | >1400 | None |
| 5 | $LiTiS_2$ | $0.6Li_2S$-$0.4P_2S_5$ | In | >1100 | >1200 | None |
| 6 | $LiTiS_2$ | $0.6Li_2S$-$0.4B_2S_3$ | In | >1000 | >1300 | None |
| 7 | $Li_xMoS_2$ (x = 1) | $0.02Li_3PO_4$-$0.59Li_2S$-$0.39B_2S_3$ | In | >1200 | >1100 | None |
| 8 | $Li_xMoS_2$ (x = 0.9) | $0.02Li_3PO_4$-$0.59Li_2S$-$0.39B_2S_3$ | 0.6In-0.4Pb | >1200 | >1050 | None |
| 9 | $Li_xCoO_2$ (x = 1) | $0.02Li_2O$-$0.59Li_2S$-$0.39SiS_2$ | In | >1000 | >1300 | None |
| 10 | $Li_xCoO_2$ (x = 1) | $0.02Li_2O$-$0.59Li_2S$-$0.39SiS_2$ | 0.4In-0.3Pb-0.3Bi | >1200 | >1350 | None |

TABLE 2

| Example No. | Cathode active material | Solid electrolyte | Anode | Charge/discharge cycle No. | Impedance change (hr.) | Dendrite formation |
|---|---|---|---|---|---|---|
| 11 | $LiCoO_2$ | $0.02Li_2SO_4$-$0.63Li_2S$-$0.35SiS_2$ | In | >1300 | >1200 | None |
| 12 | $LiCoO_2$ | $0.02Li_2CO_3$-$0.93Li_2S$-$0.35SiS_2$ | In | >1100 | >1500 | None |
| 13 | $LiCoO_2$ | $0.01Li_3PO_4$-$0.23Li_2S$-$0.36SiS_2$ | 0.4In-0.3Pb-0.3Bi | >1500 | >2000 | None |
| 14 | $Li_xNiO_2$ (x = 1) | $0.01Li_3PO_4$-$0.63Li_2S$-$0.36SiS_2$ | In | >1000 | >1800 | None |
| 15 | $Li_xNiO_2$ (x = 1) | $0.01Li_3PO_4$-$0.63Li_2S$-$0.39SiS_2$ | 0.6In-0.4Bi- | >1100 | >1650 | None |
| 16 | $Li_xMnO_2$ (x = 1) | $0.01Li_3PO_4$-$0.63Li_2S$-$0.36SiS_2$ | In | >1200 | >1400 | None |
| 17 | $Li_xMnO_2$ (x = 1) | $0.01Li_3PO_4$-$0.23Li_2S$-$0.36SiS_2$ | 0.4In-0.3Bi-0.3Sn | >1050 | >1300 | None |
| 18 | $LiMn_2O_4$ | $0.01Li_3PO_4$-$0.63Li_2S$-$0.36SiS_2$ | In | >1100 | >1500 | None |
| 19 | $LiTiS_2$ | $0.01Li_3PO_4$-$0.63Li_2S$-$0.36SiS_2$ | In | >1000 | >1600 | None |
| 20 | $LiMoS_2$ | $0.01Li_3PO_4$-$0.63Li_2S$-$0.36SiS_2$ | In | >900 | >1200 | None |

TABLE 3

| Example No. | Cathode active material | Solid electrolyte | Anode | Charge/discharge cycle No. | Impedance change (hr.) | Dendrite formation |
|---|---|---|---|---|---|---|
| 21 | $Li_xMo_6S_8$ (x = 1) | $0.01Li_3PO_4$-$0.63Li_2S$-$0.36SiS_2$ | In | >1200 | >1400 | None |
| 22 | $Li_xMo_6S_8$ (x = 1) | $0.01Li_3PO_4$-$0.63Li_2S$-$0.36SiS_2$ | 0.6In-0.4Zn | >1400 | >1300 | None |
| 23 | $LiCoO_2$ | $0.02Li_3PO_4$-$0.63Li_2S$-$0.35SiS_2$ | Pb | >1200 | >1400 | None |
| 24 | $LiCoO_2$ | $0.02Li_3PO_4$-$0.63Li_2S$-$0.35SiS_2$ | Zn | >1300 | >1000 | None |
| 25 | $LiCoO_2$ | $0.02Li_3PO_4$-$0.63Li_2S$-$0.35SiS_2$ | Sn | >950 | >1100 | None |
| 26 | $LiCoO_2$ | $0.02Li_3PO_4$-$0.63Li_2S$-$0.35SiS_2$ | Sb | >900 | >1200 | None |
| 27 | $LiCoO_2$ | $0.02Li_3PO_4$-$0.63Li_2S$-$0.35SiS_2$ | Bi | >1000 | >1300 | None |
| 28 | $LiCoO_2$ | $0.02Li_3PO_4$-$0.63Li_2S$-$0.35SiS_2$ | Cd | >1200 | >1400 | None |
| 29 | $LiCoO_2$ | $0.02Li_3PO_4$-$0.63Li_2S$-$0.35SiS_2$ | Ga | >1400 | >1800 | None |
| 30 | $LiCoO_2$ | $0.02Li_3PO_4$-$0.63Li_2S$-$0.35SiS_2$ | Tl | >1300 | >1700 | None |

Comparative Example 1

For comparative purpose, an electrode assembly was configured by employing an indium foil disk having a diameter of 10 mm and a thickness of 0.1 mm and a press-molded disk of lithium cobalt dioxide ($LiCoO_2$) powder having a diameter of 10 mm and a thickness of 0.5 mm as the anode and the cathode active material, respectively. The disks were faced with each other, via a separator made of polyethylene resin placed between both disks, and housed in a battery casing. A lithium secondary battery which employs an organic electrolyte was configured by injecting a 1M-$LiClO_4$ propylene carbonate solution into the battery casing.

The lithium secondary battery thus obtained was subjected to repeated charging and discharging cycles at a current density of 100 μA/cm². As a result, the discharge capacity of the battery at the second cycle remarkably differed from its initial value, accounting for about 80% of the initial value. After about 50 charging and discharging cycles, a decrease in the charge/discharge capacity was recognized, and the battery finally became unable to be charged or discharged after the 230th cycle. On the observation of disassembled battery, it was found that the anode indium foil alloyed with lithium was reduced into minute particles and partly fallen off. It was further found that the dendrites of lithium were formed and penetrating the separator at parts escaping the falling-off.

In addition, the results of measurements of the changes in impedance by aging, performed by placing the batteries of similar configurations in their charged state in a thermostat at 80° C., showed a change in the impedance at the initial stage of the measurements. This change is considered due to possible passivation of the surface of the metal anode.

Comparative Example 2

A battery similar to that in Example 13 was configured, using a $0.45LiI$-$0.35Li_2S$-$0.2SiS_2$ glass as the solid electrolyte for comparative purpose.

The lithium secondary battery thus obtained was subjected to repeated charging and discharging cycles at a current density of 100 μA/cm². As a result, a phenomenon of gradual decrease in discharge capacity of the battery was recognized with the progress of charging and discharging cycles, and no increase in the cell voltage occurred during the charging operation after a lapse of 300 cycles. As a result of disassembling the lithium secondary battery and the subsequent observation through a microscope on the state of the interface between the anode and the solid electrolyte, a formation of dendrites was observed. The failure in the charging operation may be caused by possible short-circuiting due to the formed dendrites.

In addition, the results of measurements of the changes in impedance by aging, performed by placing the batteries of similar configurations in their charged state in a thermostat at 80° C., showed an increase in the impedance after 15 hours.

Comparative Example 3

For comparative purpose, a battery similar to that in Example 13 was configured using a $0.6Li_2S$-$0.4B_2S_3$ glass as the solid electrolyte.

The lithium secondary battery thus obtained was subjected to repeated charging and discharging cycles at a current density of 100 μA/cm². As a result, a phenomenon of gradual decrease in discharge capacity of the battery was recognized with the progress of charging and discharging cycles. In addition, the results of measurements of its impedance, performed at each rest period after the charging operation in the course of repeating charging and discharging cycles, showed an increase in the impedance with the progress of the cycles. This suggests that a decomposition of the solid electrolyte may occur in the course of repeating charging and discharging cycles.

Comparative Example 4

For comparative purpose, a battery similar to that in Example 1 was configured by employing a $0.6Li_2S\text{-}0.4P_2S_5$ glass, $LiNiO_2$, and lead as the solid electrolyte, the cathode active material, and the anode metal, respectively.

The lithium secondary battery thus obtained was subjected to repeated charging and discharging cycles at a current density of 100 μA/cm$^2$. As a result, a decrease in discharge capacity of the battery by ten and several percent was recognized with the progress of charging and discharging cycles. In addition, the results of measurements of its impedance, performed at each rest period after the charging operation in the course of repeating charging and discharging cycles, showed an increase in the impedance with the progress of the cycles. This suggests that a decomposition of the solid electrolyte may occur in the course of repeated charging and discharging cycles.

EXAMPLE 31

A lithium secondary battery was configured by employing an indium (In) powder as the anode, a $0.01Li_3PO_4\text{-}0.63Li_2S\text{-}0.36SiS_2$ glass as the lithium ion-conductive solid electrolyte and lithium cobalt dioxide ($LiCoO_2$) as the cathode, respectively. Details thereof are shown as follows.

First, the lithium ion-conductive solid electrolyte in a glass state represented by the formula $0.01Li_3PO_4\text{-}0.63Li_2S\text{-}0.36SiS_2$ was pulverized in a mortar to have a particle size corresponding to 100 mesh or smaller, and the pulverized product was press-molded into a disk having a diameter of 10 mm and a thickness of 0.5 mm.

Then, the lithium cobalt dioxide ($LiCoO_2$) was mixed with the above-mentioned pulverized product of lithium ion-conductive solid electrolyte in the glass state at a weight ratio of 2:3, and the mixture was press-molded into a disk having a diameter of 10 mm and a thickness of 0.5 mm to give a cathode.

An anode was prepared by mixing the indium powder with the above-mentioned pulverized product of lithium ion-conductive solid electrolyte in the glass state at a weight ratio of 2:1, and the mixture was press-molded into a disk having a diameter of 10 mm and a thickness of 0.1 mm to give an anode.

Thereafter, a solid lithium secondary battery was configured by sandwiching the above-mentioned molded solid electrolyte between the above-mentioned anode and cathode, by pressure.

The lithium secondary battery thus obtained was subjected to repeated charging and discharging cycles at a current density of 100 μA/cm$^2$. As a result, the charge/discharge capacity of the battery showed no decrease from its initial value even after 800 charging and discharging cycles. The charge/discharge efficiency was maintained at 100% during the repetition and the battery operated stably.

When this lithium battery was disassembled in its charged state to observe the state of an interface between the anode and the solid electrolyte through a microscope, any formation of dendrites was not recognized.

In addition, the results of measurements of the changes in impedance by aging, performed by placing the battery in its charged state in a thermostat at 80° C., showed no change in the impedance even after 1,000 hours.

EXAMPLE 32

A procedure similar to that in Example 13 was followed for configuring another solid-state lithium secondary battery except for the use of indium-lead alloy foil for the anode.

The indium-lead alloy was obtained by bringing an indium foil into close contact with a lead foil at an atomic ratio of 3:2 by pressure, and alloying both to effect solid phase reaction in an argon atmosphere at 200° C. for 48 hours.

The lithium secondary battery thus obtained was subjected to repeated charging and discharging cycles at a current density of 100 μA/cm$^2$. As a result, the charge/discharge capacity of the battery did not decrease from its initial value even after 800 charging and discharging cycles. The charge/discharge efficiency was maintained at 100% during the tests and no change was observed on the charge/discharge curve.

When this lithium secondary battery was disassembled in its charged state to observe the state of an interface between the anode and the solid electrolyte through a microscope, any formation of dendrites was not recognized.

In addition to the specified anode metals shown in the above-mentioned examples, a technical advantage similar to that of these examples is obtained by using any of indium, lead, tin, zinc, cadmium, antimony, bismuth, gallium and titanium, or any alloy composed of any two of these metals.

EXAMPLE 33

A lithium secondary battery was configured by employing an indium-lead alloy (0.5In-0.5Li) foil as the anode active material, a $0.01Li_3PO_4\text{-}0.63Li_2S\text{-}0.36SiS_2$ glass as the lithium ion-conductive solid electrolyte and lithium cobalt dioxide ($LiCoO_2$) as the cathode active material, respectively. Details thereof are shown as follows.

First, the lithium ion-conductive solid electrolyte in a glass state represented by the formula $0.01Li_3PO_4\text{-}0.63Li_2S\text{-}0.36SiS_2$ was pulverized in a mortar to have a particle size corresponding to 100 mesh or smaller, and the pulverized product was press-molded into a disk having a diameter of 10 mm and a thickness of 1.0 mm.

Then, the lithium cobalt dioxide ($LiCoO_2$) was mixed with the above-mentioned pulverized product of lithium ion-conductive solid electrolyte in the glass state at a weight ratio of 2:3, and the mixture was press-molded into a disk having a diameter of 10 mm and a thickness of 0.5 mm to give a cathode.

An anode was prepared by punching an indium-lead alloy (0.5In-0.5Li) foil having a thickness of 0.1 mm into a disk having a diameter of 10 mm. To prepare the indium-lead alloy foil, an indium foil and a lithium foil were laminated together and brought into close contact at an atomic ratio of 1:1 by pressure to cause alloying, and rolled to a thickness of 0.1 mm.

Thereafter, a solid-state lithium secondary battery was configured by sandwiching the above-mentioned molded solid electrolyte between the above-mentioned anode and cathode, by pressure.

The lithium secondary battery thus obtained was subjected to repeated charging and discharging cycles at a current density of 100 μA/cm$^2$. As a result, there was no decrease in the charge/discharge capacity of the battery from its initial value even after a lapse of 1,000 cycles. The charge/discharge efficiency was maintained at about 100% throughout the repeated charging and discharging cycles and the battery operated stably.

When this lithium battery was disassembled in its charged state to observe the state of an interface between the anode and the solid electrolyte through a microscope, any formation of lithium dendrites was not recognized.

In addition, the results of measurements of the changes in impedance by aging, performed by placing the battery in its charged state in a thermostat at 80° C., showed no change in the impedance after a lapse of 2,000 hours.

This shows that in accordance with the present invention, a lithium secondary battery can be obtained which has a high safety and is free from the formation and growth of lithium dendrites.

EXAMPLES 34–62

Batteries were configured by repeating the procedures disclosed in Example 33 except that different materials were used for the anode, the solid electrolyte and the cathode in various combinations as listed in Table 4, Table 5 and Table 6 below. These batteries were evaluated in a manner similar to that in Example 33. Table 4, Table 5 and Table 6 summarize the results of evaluations on the batteries configured with various combinations, together with the result of Example 33.

TABLE 4

| Example No. | Cathode active material | Solid electrolyte | Anode | Charge/discharge cycle No. | Impedance change (hr.) | Dendrite formation |
|---|---|---|---|---|---|---|
| 33 | $Li_xCoO_2$ ($x = 1$) | $0.01Li_3PO_4$-$0.63Li_2S$-$0.36SiS_2$ | $0.5In$-$0.5Li$ | >1000 | >2000 | None |
| 34 | $Li_xTiS_2$ ($x = 1$) | $0.6Li_2S$-$0.4SiS_2$ | $0.5In$-$0.5Li$ | >900 | >1600 | None |
| 35 | $Li_xTiS_2$ ($x = 0$) | $0.6Li_2S$-$0.4SiS_2$ | $0.5In$-$0.5Li$ | >1000 | >1400 | None |
| 36 | $LiTiS_2$ | $0.6Li_2S$-$0.4Al_2S_3$ | $0.6In$-$0.4Li$ | >950 | >1300 | None |
| 37 | $LiTiS_2$ | $0.6Li_2S$-$0.4P_2S_5$ | $0.6In$-$0.4Li$ | >1000 | >1500 | None |
| 38 | $LiTiS_2$ | $0.6Li_2S$-$0.4B_2S_3$ | $0.6In$-$0.4Li$ | >1200 | >1400 | None |
| 39 | $Li_xMoS_2$ ($x = 1$) | $0.02Li_3PO_4$-$0.59Li_2S$-$0.39B_2S_3$ | $0.6In$-$0.4Li$ | >1200 | >1400 | None |
| 40 | $Li_xMoS_2$ ($x = 0$) | $0.02Li_3PO_4$-$0.59Li_2S$-$0.39B_2S_3$ | $0.6In$-$0.4Li$ | >1100 | >950 | None |
| 41 | $Li_xCoO_2$ ($x = 1$) | $0.02Li_2O$-$0.59Li_2S$-$0.39SiS_2$ | $0.5In$-$0.5Li$ | >1000 | >1200 | None |
| 42 | $Li_xCoO_2$ ($x = 0.1$) | $0.02Li_2O$-$0.59Li_2S$-$0.39SiS_2$ | $0.5In$-$0.5Li$ | >1050 | >1250 | None |

TABLE 5

| Example No. | Cathode active material | Solid electrolyte | Anode | Charge/discharge cycle No. | Impedance change (hr.) | Dendrite formation |
|---|---|---|---|---|---|---|
| 43 | $LiCoO_2$ | $0.02Li_2SO_4$-$0.63Li_2S$-$0.35SiS_2$ | $0.5In$-$0.5Li$ | >1200 | >1400 | None |
| 44 | $LiCoO_2$ | $0.02Li_2CO_3$-$0.63Li_2S$-$0.35SiS_2$ | $0.5In$-$0.5Li$ | >1300 | >1300 | None |
| 45 | $LiCoO_2$ | $0.02Li_3PO_4$-$0.63Li_2S$-$0.35SiS_2$ | $0.6In$-$0.4Li$ | >1600 | >1900 | None |
| 46 | $Li_xNiO_2$ ($x = 1$) | $0.01Li_3PO_4$-$0.63Li_2S$-$0.36SiS_2$ | $0.5In$-$0.5Li$ | >1100 | >1800 | None |
| 47 | $Li_xMnO_2$ | $0.01Li_3PO_4$- | $0.5In$- | >1000 | >1750 | None |

TABLE 5-continued

| Example No. | Cathode active material | Solid electrolyte | Anode | Charge/discharge cycle No. | Impedance change (hr.) | Dendrite formation |
|---|---|---|---|---|---|---|
| | (x = 0.1) | 0.63Li$_2$S-0.36SiS$_2$ | 0.5Li | | | |
| 48 | Li$_x$MnO$_2$ (x = 1) | 0.01Li$_3$PO$_4$-0.63Li$_2$S-0.36SiS$_2$ | 0.5In-0.5Li | >1200 | >1500 | None |
| 49 | Li$_x$MnO$_2$ (x = 0.1) | 0.01Li$_3$PO$_4$-0.63Li$_2$S-0.36SiS$_2$ | 0.5In-0.5Li | >1150 | >1300 | None |
| 50 | LiMn$_2$O$_4$ | 0.01Li$_3$PO$_4$-0.63Li$_2$S-0.36SiS$_2$ | 0.6In-0.4Li | >1000 | >1350 | None |
| 51 | LiTiS$_2$ | 0.01Li$_3$PO$_4$-0.63Li$_2$S-0.36SiS$_2$ | 0.6In-0.4Li | >1100 | >1700 | None |
| 52 | LiMoS$_2$ | 0.01Li$_3$PO$_4$-0.63Li$_2$S-0.36SiS$_2$ | 0.6In-0.4Li | >950 | >1800 | None |

TABLE 6

| Example No. | Cathode active material | Solid electrolyte | Anode | Charge/discharge cycle No. | Impedance change (hr.) | Dendrite formation |
|---|---|---|---|---|---|---|
| 53 | Li$_x$Mo$_6$S$_8$ (x = 1) | 0.01Li$_3$PO$_4$-0.63Li$_2$S-0.36SiS$_2$ | 0.5In-0.5Li | >1050 | >1600 | None |
| 54 | Li$_x$Mo$_6$S$_8$ (x = 1) | 0.01Li$_3$PO$_4$-0.63Li$_2$S-0.36SiS$_2$ | 0.5In-0.5Li | >1100 | >1400 | None |
| 55 | LiCoO$_2$ | 0.02Li$_3$PO$_4$-0.63Li$_2$S-0.35SiS$_2$ | 0.6Pb-0.4Li | >1300 | >1500 | None |
| 56 | LiCoO$_2$ | 0.02Li$_3$PO$_4$-0.63Li$_2$S-0.35SiS$_2$ | 0.6Zn-0.4Li | >1400 | >1200 | None |
| 57 | LiCoO$_2$ | 0.02Li$_3$PO$_4$-0.63Li$_2$S-0.35SiS$_2$ | 0.5Sn-0.5Li | >1100 | >1000 | None |
| 58 | LiCoO$_2$ | 0.02Li$_3$PO$_4$-0.63Li$_2$S-0.35SiS$_2$ | 0.5Sb-0.5Li | >1000 | >1100 | None |
| 59 | LiCoO$_2$ | 0.02Li$_3$PO$_4$-0.63Li$_2$S-0.35SiS$_2$ | 0.6Bi-0.4Li | >1200 | >1100 | None |
| 60 | LiCoO$_2$ | 0.02Li$_3$PO$_4$-0.63Li$_2$S-0.35SiS$_2$ | 0.7Cd-0.3Li | >1000 | >1400 | None |
| 61 | LiCoO$_2$ | 0.02Li$_3$PO$_4$-0.63Li$_2$S-0.35SiS$_2$ | 0.7Ga-0.3Li | >1300 | >1700 | None |
| 62 | LiCoO$_2$ | 0.02Li$_3$PO$_4$-0.63Li$_2$S-0.35SiS$_2$ | 0.5Ti-0.5Li | >1400 | >1600 | None |

Comparative Example 5

For comparative purpose, an electrode assembly was configured by employing an indium-lithium alloy (0.5In-0.5Li) foil disk having a diameter of 10 mm and a thickness of 0.1 mm and a press-molded disk of lithium cobalt dioxide (LiCoO$_2$) powder having a diameter of 10 mm and a thickness of 0.5 mm as the anode and the cathode active material, respectively. The disks were faced with each other, via a separator made of polyethylene resin placed between both disks, and housed in a battery casing. A lithium secondary battery which employs an organic electrolyte was configured by injecting a 1M-LiClO$_4$ propylene carbonate solution into the battery casing.

The lithium secondary battery thus obtained was subjected to repeated charging and discharging cycles at a current density of 100 μA/cm$^2$. As a result, the discharge capacity of the battery at the second cycle remarkably differed from its initial value, accounting for about 80% of the initial value. After about 80 charging and discharging cycles, a decrease in the charge/discharge capacity was recognized, and the battery finally became unable to be charged or discharged after the 250th cycle. On the observation of disassembled battery, it was found that the anode indium-lithium alloy foil was reduced into minute particles and partly fallen off. It was further found that the dendrites of lithium were formed and penetrating the separator at parts escaping the falling-off.

In addition, the results of measurements of the changes in impedance by aging, performed by placing the batteries of similar configurations in their charged state in a thermostat at 80° C., showed a change in the impedance at the initial stage of the measurements. This change is considered due to possible passivation of the surface of the metal anode.

Comparative Example 6

A battery similar to that in Example 45 was configured, using a $0.45LiI-0.35Li_2S-0.2SiS_2$ glass as the solid electrolyte for comparative purpose.

The lithium secondary battery thus obtained was subjected to repeated charging and discharging cycles at a current density of 100 $\mu A/cm^2$. As a result, a phenomenon of gradual decrease in discharge capacity of the battery was recognized with the progress of charging and discharging cycles, and no increase in the cell voltage occurred during the charging operation after a lapse of 300 cycles. As a result of disassembling the lithium secondary battery and the subsequent observation through a microscope on the state of the interface between the anode and the solid electrolyte, a formation of dendrites was observed. The failure in the charging operation may be caused by possible short-circuiting due to the formed dendrites.

In addition, the results of measurements of the changes in impedance by aging, performed by placing the batteries of similar configurations in their charged state in a thermostat at 80° C., showed an increase in the impedance after 20 hours.

Comparative Example 7

For comparative purpose, a battery similar to that in Example 45 was configured using a $0.6Li_2S-0.4B_2S_3$ glass as the solid electrolyte.

The lithium secondary battery thus obtained was subjected to repeated charging and discharging cycles at a current density of 100 $\mu A/cm^2$. As a result, a phenomenon of gradual decrease in discharge capacity of the battery was recognized with the progress of charging and discharging cycles. In addition, the results of measurements of its impedance, performed at each rest period after the charging operation in the course of repeating charging and discharging cycles, showed an increase in the impedance with the progress of the cycles. This suggests that a decomposition of the solid electrolyte may occur in the course of repeated charging and discharging cycles.

Comparative Example 8

For comparative purpose, a battery similar to that in Example 33 was configured by employing a $0.6Li_2S-0.4P_2S_5$ glass, $LiNiO_2$, and a lead-lithium alloy (0.6Pb-0.4Li) as the solid electrolyte, the cathode active material, and the anode metal, respectively.

The lithium secondary battery thus obtained was subjected to repeated charging and discharging cycles at a current density of 100 $\mu A/cm^2$. As a result, a decrease in discharge capacity of the battery by ten and several percent was recognized with the progress of charging and discharging cycles. In addition, the results of measurements of its impedance, performed at each rest period after the charging operation in the course of repeating charging and discharging cycles, showed an increase in the impedance with the progress of the cycles. This suggests that a decomposition of the solid electrolyte may occur in the course of repeated charging and discharging cycles.

EXAMPLE 63

A lithium secondary battery was configured by employing an indium-lithium alloy (0.5In-0.5Li) powder as the anode, a $0.01Li_3PO_4-0.63Li_2S-0.36SiS_2$ glass as the lithium ion-conductive solid electrolyte and lithium cobalt dioxide ($LiCoO_2$) as the cathode, respectively. Details thereof are shown as follows.

First, the lithium ion-conductive solid electrolyte in a glass state represented by the formula $0.01Li_3PO_4-0.63Li_2S-0.36SiS_2$ was pulverized in a mortar to have a particle size corresponding to 100 mesh or smaller, and the pulverized product was press-molded into a disk having a diameter of 10 mm and a thickness of 0.5 mm.

Then, the lithium cobalt dioxide ($LiCoO_2$) was mixed with the above-mentioned pulverized product of lithium ion-conductive solid electrolyte in the glass state at a weight ratio of 2:3, and the mixture was press-molded into a disk having a diameter of 10 mm and a thickness of 0.5 mm to give a cathode.

An anode was prepared by mixing the indium-lithium alloy (0.5In-0.5Li) powder with the above-mentioned pulverized product of lithium ion-conductive solid electrolyte in the glass state at a weight ratio of 2:1, and the mixture was press-molded into a disk having a diameter of 10 mm and a thickness of 0.1 mm to give an anode.

Thereafter, a solid lithium secondary battery was configured by sandwiching the above-mentioned molded solid electrolyte between the above-mentioned anode and cathode, by pressure.

The lithium secondary battery thus obtained was subjected to repeated charging and discharging cycles at a current density of 100 $\mu A/cm^2$. As a result, the charge/discharge capacity of the battery showed no decrease from its initial value even after 900 charging and discharging cycles. The charge/discharge efficiency was maintained at 100% during the repetition and the battery operated stably.

When this lithium battery was disassembled in its charged state to observe the state of an interface between the anode and the solid electrolyte through a microscope, any formation of dendrites was not recognized.

In addition, the results of measurements of the changes in impedance by aging, performed by placing the battery in its charged state in a thermostat at 80° C., showed no change in the impedance even after 1,000 hours.

EXAMPLE 64

A procedure similar to that in Example 45 was followed for configuring another solid-state lithium secondary battery except for the use of indium-lead-lithium (0.5In-0.2Pb-0.3Li) alloy foil for the anode.

To prepare the indium-lead-lithium alloy, an indium foil, a lead foil and a lithium foil were brought into close contact with each other at an atomic ratio of 5:2:3 by pressure, and the whole was alloyed to effect solid phase reaction in an argon atmosphere at 150° C. for 48 hours.

The lithium secondary battery thus obtained was subjected to repeated charging and discharging cycles at a current density of 100 µA/cm². As a result, the charge/discharge capacity of the battery did not decrease from its initial value even after 800 charging and discharging cycles. The charge/discharge efficiency was maintained at 100% during the tests and no change was observed on the charge/discharge curve.

When this lithium secondary battery was disassembled in its charged state to observe the state of an interface between the anode and the solid electrolyte through a microscope, any formation of dendrites was not recognized.

EXAMPLE 65

Another solid-state lithium secondary battery was prepared in a similar manner to that in Example 45, except for the use of gallium-aluminum-lithium alloy powder (0.5Ga-0.3Al-0.2Li) for the anode.

To prepare the gallium-aluminum-lithium alloy powder, aluminum powder, gallium powder and lithium foil were mixed well/at an atomic ratio of 3:5:2 and pulverized into minute particles in a mortar, which was then allowed to react in an argon atmosphere at 150° C. for 24 hours.

The gallium-aluminum-lithium alloy powder thus obtained was mixed with an ion-conductive lithium glass powder represented by the formula $0.02Li_3PO_4$-$0.63Li_2S$-$0.35SiS_2$ at a weight ratio of 2:1, and the mixture was then press-molded into a disk having a thickness of 0.1 mm and a diameter of 10 mm to give an anode for use.

The lithium secondary battery thus obtained was subjected to repeated charging and discharging cycles at a current density of 100 µA/cm². As a result, the charge/discharge capacity of the battery maintained its initial value even after 900 charging and discharging cycles. The charge/discharge efficiency was 100% during the tests and there was no change in the charge/discharge curve.

When the lithium secondary battery was disassembled in its charged state to observe the state of the interface between the anode and the solid electrolyte on a microscope, formation of lithium dendrites was not observed on the interface.

Although the specified lithium alloys are used as the anode in Example 33 to Example 65, a similar technical advantage is obtained by any other lithium alloy composed of lithium and at least one metal selected from the group consisting of In, Pb, Zn, Sn, Sb, Bi, Cd, Ga and Ti.

EXAMPLE 66

A lithium secondary battery was configured by employing an aluminum foil as the anode active material, a $0.01Li_3PO_4$-$0.63Li_2S$-$0.36SiS_2$ glass as the lithium ion-conductive solid electrolyte and lithium cobalt dioxide ($LiCoO_2$) as the cathode active material, respectively. Details thereof are shown as follows.

First, the lithium ion-conductive solid electrolyte in a glass state represented by the formula $0.01Li_3PO_4$-$0.63Li_2S$-$0.36SiS_2$ was pulverized in a mortar to have a particle size corresponding to 100 mesh or smaller, and the pulverized product was press-molded into a disk having a diameter of 10 mm and a thickness of 1.0

Then, the lithium cobalt dioxide ($LiCoO_2$) was mixed with the above-mentioned pulverized product of lithium ion-conductive solid electrolyte in the glass state at a weight ratio of 2:3, and the mixture was press-molded into a disk having a diameter of 10 mm and a thickness of 0.5 mm to give a cathode.

An anode was prepared having at the aluminum foil having a thickness of 0.1 mm into a disk having a diameter of 10 mm. Thereafter, a solid lithium secondary battery was configured by sandwiching the above-mentioned molded solid electrolyte between the above-mentioned anode and cathode, by pressure.

The lithium secondary battery thus obtained was subjected to repeated charging and discharging cycles at a current density of 100 µA/cm². As a result, the charge/discharge capacity of the battery did not decrease from its initial value even after 1,000 cycles. The charge/discharge efficiency was maintained at about 100% throughout the repeated charging and discharging cycles and the battery operated stably.

When this lithium battery was disassembled in its charged state to observe the state of an interface between the anode and the solid electrolyte through a microscope, any formation of dendrites was not recognized.

In addition, the results of measurements of the changes in impedance by aging, performed by placing the battery in its charged state in a thermostat at 80° C., showed no change in the impedance after 1,800 hours.

Thus, it is concluded that in accordance with the present invention, a lithium secondary battery can be obtained which has a high safety and is free from the formation and growth of lithium dendrites.

EXAMPLES 67–87

Batteries were configured by repeating the procedures disclosed in Example 66 except for the use of different materials for the anode, the solid electrolyte and the cathode in various combinations as listed in Table 7, Table 8 and Table 9 below. These batteries were evaluated in a manner similar to that in Example 66. Table 7, Table 8 and Table 9 summarize the results of evaluations on the batteries configured with these combinations, together with the result of Example 66.

TABLE 7

| Example No. | Cathode active material | Solid electrolyte | Anode | Charge/discharge cycle No. | Impedance change (hr.) | Dendrite formation |
|---|---|---|---|---|---|---|
| 66 | $Li_xCoO_2$ (x = 1) | $0.01Li_3PO_4$-$0.63Li_2S$-$0.36SiS_2$ | Al | >1000 | >1800 | None |
| 67 | $Li_xTiS_2$ (x = 1) | $0.6Li_2S$-$0.4SiS_2$ | Al | >900 | >1600 | None |

TABLE 7-continued

| Example No. | Cathode active material | Solid electrolyte | Anode | Charge/ discharge cycle No. | Impedance change (hr.) | Dendrite formation |
|---|---|---|---|---|---|---|
| 68 | $Li_xTiS_2$ (x = 0) | $0.6Li_2S$-$0.4SiS_2$ | 0.5Al-0.5Li | >1000 | >1400 | None |
| 69 | $LiTiS_2$ | $0.6Li_2S$-$0.4Al_2S_3$ | Al | >950 | >1300 | None |
| 70 | $LiTiS_2$ | $0.6Li_2S$-$0.4B_2S_5$ | Al | >1000 | >1500 | None |
| 71 | $LiTiS_2$ | $0.6Li_2S$-$0.4B_2S_3$ | Al | >1200 | >1400 | None |
| 72 | $Li_xMoS_2$ (x = 1) | $0.6Li_2S$-$0.4B_2S_3$ | Al | >1100 | >1000 | None |
| 73 | $Li_xMoS_2$ (x = 0.1) | $0.4Li_2S$-$0.4B_2S_3$ | 0.5Al-0.5Li | >1000 | >950 | None |
| 74 | $Li_xMo_6O_8$ (x = 1) | $0.02Li_2O$-$0.59Li_2S$-$0.39B_2S_3$ | Al | >900 | >1100 | None |
| 75 | $Li_xCoO_2$ (x = 1) | $0.02Li_2O$-$0.59Li_2S$-$0.39SiS_2$ | Al | >1000 | >1200 | None |

TABLE 8

| Example No. | Cathode active material | Solid electrolyte | Anode | Charge/ discharge cycle No. | Impedance change (hr.) | Dendrite formation |
|---|---|---|---|---|---|---|
| 76 | $Li_xCoO_2$ (x = 1) | $0.02Li_2O$-$0.59Li_2S$-$0.39SiS_2$ | 0.6Al-0.4Li | >1050 | >1050 | None |
| 77 | $LiCoO_2$ | $0.012Li_2SO_4$-$0.63Li_2S$-$0.36SiS_2$ | Al | >1200 | >1400 | None |
| 78 | $LiCoO_2$ | $0.01Li_2CO_3$-$0.63Li_2S$-$0.36SiS_2$ | Al | >1300 | >1300 | None |
| 79 | $LiCoO_2$ | $0.02Li_3PO_4$-$0.63Li_2S$-$0.35SiS_2$ | 0.6Al-0.4Li | >1600 | >1900 | None |
| 80 | $Li_xNiO_2$ (x = 1) | $0.01Li_3PO_4$-$0.63Li_2S$-$0.36SiS_2$ | Al | >1100 | >1800 | None |
| 81 | $Li_xNiO_2$ (x = 0.2) | $0.01Li_3PO_4$-$0.63Li_2S$-$0.36SiS_2$ | 0.6Al-0.4Li | >1300 | >1700 | None |
| 82 | $Li_xMnO_2$ (x = 1) | $0.01Li_3PO_4$-$0.63Li_2S$-$0.36SiS_2$ | Al | >1200 | >1500 | None |

TABLE 9

| Example No. | Cathode active material | Solid electrolyte | Anode | Charge/ discharge cycle No. | Impedance change (hr.) | Dendrite formation |
|---|---|---|---|---|---|---|
| 83 | $Li_xMnO_2$ (x = 1) | $0.01Li_3PO_4$-$0.63Li_2S$-$0.36SiS_2$ | 0.5Al-0.5Li | >1400 | >1200 | None |
| 84 | $LiMn_2O_4$ | $0.01Li_3PO_4$-$0.63Li_2S$-$0.36SiS_2$ | Al | >1000 | >1350 | None |
| 85 | $LiTiS_2$ | $0.01Li_3PO_4$- | Al | >1100 | >1700 | None |

TABLE 9-continued

| Example No. | Cathode active material | Solid electrolyte | Anode | Charge/discharge cycle No. | Impedance change (hr.) | Dendrite formation |
|---|---|---|---|---|---|---|
| 86 | LiMoS$_2$ | 0.63Li$_2$S-0.36SiS$_2$ 0.01Li$_3$PO$_4$-0.63Li$_2$S-0.36SiS$_2$ | Al | >950 | >1800 | None |
| 87 | LiCoO$_2$ | 0.01Li$_3$PO$_4$-0.63Li$_2$S-0.36SiS$_2$ | 0.6Al- | >1100 | >1700 | None |

Comparative Example 9

For comparative purpose, an electrode assembly was configured by employing an aluminum-lithium alloy (atomic ratio of 3:2) foil disk having a diameter of 10 mm and a thickness of 0.1 mm, and a press-molded disk of lithium cobalt dioxide (LiCoO$_2$) powder having a diameter of 10 mm and a thickness of 0.5 mm, as the anode and the cathode, respectively. The disks were combined to face with each other, via a separator made of polyethylene resin placed between both disks, and housed in a battery casing. A lithium secondary battery which employs an organic electrolyte was configured by injecting a 1M-LiClO$_4$ propylene carbonate solution into the battery casing.

The lithium secondary battery thus obtained was subjected to repeated charging and discharging cycles at a current density of 100 μA/cm$^2$. As a result, the discharge capacity of the battery at the second cycle remarkably differed from its initial value, accounting for about 80% of the initial value. After about 80 charging and discharging cycles, a decrease in the charge/discharge capacity was recognized, and the battery finally became unable to be charged or discharged after the 250th cycle. On the observation of disassembled battery, it was found that the aluminum-lithium alloy foil of the anode was reduced into minute particles and partly fallen off. It was further found that the dendrites of lithium were formed and penetrating the separator at parts escaping the falling-off.

In addition, the results of measurements of the changes in impedance by aging, performed by placing the batteries of similar configurations in their charged state in a thermostat at 80° C., showed a change in the impedance at the initial stage of the measurements. This change is considered due to possible passivation of the surface of the metal anode.

Comparative Example 10

For comparative purpose, a battery similar to that in Example 79 except for the use of a solid electrolyte of 0.45LiI-0.35Li$_2$S-0.2SiS$_2$ glass was prepared.

The lithium secondary battery thus obtained was subjected to repeated charging and discharging cycles at a current density of 100 μA/cm$^2$. As a result, a phenomenon of gradual decrease in discharge capacity of the battery was recognized with the progress of charging and discharging cycles, and no increase in the cell voltage occurred during the charging operation after a lapse of 300 cycles. As a result of disassembling the lithium battery and the subsequent observation through a microscope on the state of the interface between the anode and the solid electrolyte, a formation of dendrites was observed. It is believed that the failure in the charging operation is caused by possible short-circuiting due to the formed dendrites.

In addition, measurements of the changes in impedance by aging, performed by placing the batteries of similar configurations in their charged state in a thermostat at 80° C., showed an increase in the impedance after 30 hours.

Comparative Example 11

For comparative purpose, a battery similar to that in Example 79 was configured by employing a 0.6Li$_2$S-0.4B$_2$S$_3$ glass as the solid electrolyte.

The lithium secondary battery thus obtained was subjected to repeated charging and discharging cycles at a current density of 100 μA/cm$^2$. As a result, a phenomenon of gradual decrease in discharge capacity of the battery was recognized with the progress of charging and discharging cycles. In addition, measurements of their impedances, performed at each rest period after the charging operation in the course of repeating charging and discharging, showed an increase in the impedance with the progress of the cycles. This suggests that a decomposition of the solid electrolyte may occur with the progress of charging and discharging cycles.

Comparative Example 12

For comparative purpose, a battery similar to that in Example 66 was configured by employing a 0.6Li$_2$S-0.4P$_2$S$_5$ glass, LiNiO$_2$ and an aluminum-lead-lithium alloy (0.5Al-0.2Pb-0.3Li) as the solid electrolyte, the cathode active material and the anode metal, respectively.

The lithium secondary battery thus obtained was subjected to repeated charging and discharging cycles at a current density of 100 μA/cm$^2$. As a result, a decrease in discharge capacity of the battery by ten and several percent was recognized with the progress of charging and discharging cycles. In addition, measurements of their impedances, performed at each rest period after the charging operation in the course of repeating charging and discharging, showed an increase in the impedance with the progress of the cycles. This may suggest that a decomposition of the solid electrolyte may occur with the progress of charging and discharging cycles.

EXAMPLE 88

A lithium secondary battery was configured by employing an aluminum-lithium (0.5Al-0.5Li) alloy powder as the anode, a 0.01Li$_3$PO$_4$-0.63Li$_2$S-0.36SiS$_2$ glass as the lithium ion-conductive solid electrolyte and lithium cobalt dioxide (LiCoO$_2$) as the cathode active material, respectively. Details thereof are shown as follows.

First, the lithium ion-conductive solid electrolyte in a glass state represented by the formula $0.01Li_3PO_4$-$0.63Li_2S$-$0.36SiS_2$ was pulverized in a mortar to have a particle size corresponding to 100 mesh or smaller, and the pulverized product was press-molded into a disk having a diameter of 10 mm and a thickness of 0.5 mm.

Then, the lithium cobalt dioxide ($LiCoO_2$) was mixed with the above-mentioned pulverized product of lithium ion-conductive solid electrolyte in the glass state at a weight ratio of 2:3, and the mixture was press-molded into a disk having a diameter of 10 mm and a thickness of 0.5 mm to give a cathode.

An anode was prepared by mixing the aluminum-lithium (0.5Al-0.5Li) alloy powder with the above-mentioned pulverized product of lithium ion-conductive solid electrolyte in the glass state at a weight ratio of 2:1, and the mixture was press-molded into a disk having a diameter of 10 mm and a thickness of 0.1 mm to give an anode.

Thereafter, a solid lithium secondary battery was configured by sandwiching the above-mentioned molded solid electrolyte between the above-mentioned anode and cathode, by pressure.

The lithium secondary battery thus obtained was subjected to repeated charging and discharging cycles at a current density of 100 μA/cm². As a result, the charge/discharge capacity of the battery did not decrease from its initial value even after 800 charging and discharging cycles. The charge/discharge efficiency was maintained at 100% throughout the repetition and the battery operated stably.

When this lithium battery was disassembled in its charged state to observe the state of an interface between the anode and the solid electrolyte through a microscope, any formation of dendrites was not recognized.

In addition, on the measurements of the changes in impedance by aging, performed by placing the battery in its charged state in a thermostat at 80° C., no change in the impedance was recognized even after a lapse of 1,000 hours.

EXAMPLE 89

A manner similar to that in Example 79 was followed to prepare another solid-state lithium secondary battery, except for the use of an aluminum-indium-lithium alloy (0.4Al-0.4In-0.2Li) foil for the anode.

To prepare the aluminum-indium-lithium alloy foil, an aluminum foil, an indium foil and a lithium foil were all laminated together and brought into close contact by pressure to reach an atomic ratio of 2:2:1, to cause solid phase reaction in an argon atmosphere at 150° C. for 48 hours.

The lithium secondary battery thus obtained was subjected to repeated charging and discharging cycles at a current density of 100 μA/cm². As a result, the charge/discharge capacity of the battery did not decrease from its initial value even after 900 charging and discharging cycles. The charge/discharge efficiency was maintained at 100% throughout the tests and no change was observed on the charge/discharge curve.

When this lithium battery was disassembled in its charged state to observe the state of an interface between the anode and the solid electrolyte through a microscope, any formation of dendrites was not recognized.

EXAMPLE 90

A manner similar to that in Example 79 was followed to prepare another solid-state lithium secondary battery, except for the use of an aluminum-gallium-lithium (0.4Al-0.3Ga-0.3Li) alloy powder for the anode.

To prepare the aluminum-gallium-lithium alloy powder, aluminum powder, gallium powder and lithium foil were weighed until reaching an atomic ratio of 4:4:3, and then the weighed materials were mixed together in a mortar to cause solid phase reaction in an argon atmosphere at 150° C. for 24 hours.

To give an anode, the alloy powder was mixed with the lithium ion-conductive glass powder represented by the formula $0.02Li_3PO_4$-$0.63Li_2S$-$0.351SiS_2$ at a weight ratio of 2:1, and the mixture was press-molded into a disk having a diameter of 10 mm and a thickness of 0.1 mm.

The lithium secondary battery thus obtained was subjected to repeated charging and discharging cycles at a current density of 100 μA/cm². As a result, the charge/discharge capacity of the battery did not decrease from its initial value even after 800 charging and discharging cycles. The charge/discharge efficiency was maintained at 100% throughout the tests and no change was observed on the charge/discharge curve.

When this lithium secondary battery was disassembled in its charged state to observe the state of an interface between the anode and the solid electrolyte through a microscope, any formation of dendrites was not recognized.

Further, although Example 66 to Example 90 are limited to the aluminum-lithium alloy, the aluminum-indium-lithium alloy and the aluminum-gallium-lithium alloy as the alloys consisting mainly of aluminum and lithium, a similar technical advantage is obtained by any other alloy, and thus the present invention should not be limited to the above-mentioned species of the alloys.

No difference is created in the essential effect of the present invention even if the combination and/or composition ratio of the cathode material, the anode material and the solid electrolyte are changed within the scope stipulated in the present invention, and a similar technical advantage is obtained by any of the combinations and/or composition ratios.

Although the present invention has been described in terms of the presently preferred embodiments, it is to be understood that such disclosures are not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A solid-state lithium secondary battery comprising:
   a cathode having as an active material at least one compound selected from the group consisting of oxides and sulfides of a transition metal,
   a lithium ion-conductive solid electrolyte of a glass represented by the formula bY-(1-b)(aLi₂S-(1-a)X), wherein X is always present and represents at least one member selected from the group consisting of $SiS_2$, $Al_2S_3$, $P_2S_5$, and $B_2S_3$, and Y represents at least one member selected from the group consisting of $Li_2O$, $Li_3PO_4$, $Li_2SO_4$, and $Li_2CO_3$, and wherein $0.3<a$ and $0 \leq b < 0.3$, and, further, wherein the solid electrolyte is essentially free of halide, and
   an anode having as an active material a single metal or an alloy containing at least one metal selected from the group consisting of In, Pb, Zn, Sn, Sb, Bi, Cd, Ga and Ti.

2. The solid-state lithium secondary battery in accordance with claim 1, wherein said anode active material is in the form alloyed with lithium.

3. The solid-state lithium secondary battery in accordance with claim 1, wherein said cathode active material is at least one member selected from the group consisting of $Li_xCoO_2$, $Li_xMnO_2$, $Li_xMn_2O$, $Li_xNiO_2$, $Li_xTiS_2$, $Li_xMoS_2$, and $Li_xMo_6S_8$ (wherein $x \geq 0$).

4. A solid-state lithium secondary battery comprising:

a cathode having as an active material at least one compound selected from the group consisting of oxides and sulfides of a transition metal, a lithium ion-conductive solid electrolyte of a glass represented by the formula $bY\text{-}(1-b)(aLi_2S\text{-}(1-a)X)$, wherein X is always present and represents at least one member selected from the group consisting of $SiS_2$, $Al_2S_3$, $P_2S_5$, and $B_2S_3$, and Y represents at least one member selected from the group consisting of $Li_2O$, $Li_3PO_4$, $Li_2SO_4$, and $Li_2CO_3$, and wherein $0.3 < a$ and $0 \leq b < 0.3$, and, further, wherein the solid electrolyte is essentially free of halide, and an anode having as an active material Al or an alloy containing Al as the main component.

5. The solid-state lithium secondary battery in accordance with claim 4, wherein said anode active material is in the form alloyed with lithium.

6. The solid-state lithium secondary battery in accordance with claim 4, wherein said cathode active material is at least one member selected from the group consisting of $Li_xCoO_2$, $Li_xMnO_2$, $Li_xMn_2O_4$, $Li_xNiO_2$, $Li_xTiS_2$, $Li_xMoS_2$, and $Li_xMo_6S_8$ (wherein $x \geq 0$).

* * * * *